United States Patent
Tian et al.

(10) Patent No.: US 8,699,465 B2
(45) Date of Patent: Apr. 15, 2014

(54) FORWARD LINK DATA RATE CONTROL AND RATE INDICATION FOR SATELLITE-ENABLED COMMUNICATIONS SYSTEMS

(75) Inventors: Bin Tian, San Diego, CA (US); Ahmad Jalali, Rancho Fanta Fe, CA (US); Srikant Jayaraman, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 12/627,974

(22) Filed: Nov. 30, 2009

(65) Prior Publication Data

US 2011/0128867 A1      Jun. 2, 2011

(51) Int. Cl.
*H04W 36/30* (2009.01)
*H04W 84/08* (2009.01)
*H04W 74/04* (2009.01)

(52) U.S. Cl.
USPC ............................ 370/332; 370/341; 370/345

(58) Field of Classification Search
None
See application file for complete search history.

(56) References Cited

U.S. PATENT DOCUMENTS

| | | | |
|---|---|---|---|
| 5,818,832 A * | 10/1998 | McCallister | 370/350 |
| 5,881,367 A | 3/1999 | Calot et al. | |
| 6,072,770 A | 6/2000 | Ho et al. | |
| 2001/0040902 A1 * | 11/2001 | Rao | 370/519 |
| 2005/0207367 A1 * | 9/2005 | Onggosanusi et al. | 370/315 |
| 2006/0072510 A1 | 4/2006 | Aizawa | |
| 2007/0121535 A1 * | 5/2007 | Chen et al. | 370/317 |
| 2007/0195736 A1 * | 8/2007 | Taira et al. | 370/335 |
| 2008/0130548 A1 * | 6/2008 | Kaikkonen et al. | 370/312 |
| 2008/0137635 A1 * | 6/2008 | Pan et al. | 370/345 |
| 2009/0225707 A1 * | 9/2009 | Baldemair et al. | 370/329 |

FOREIGN PATENT DOCUMENTS

| | | |
|---|---|---|
| JP | 2009200657 A | 9/2009 |
| TW | 200826568 A | 6/2008 |

OTHER PUBLICATIONS

International Search Report and Written Opinion—PCT/US2010/058248, ISA/EPO—May 9, 2011.
Co-pending U.S. Appl. No. 09/615,354, filed on Jul. 13, 2000.
Taiwan Search Report—TW099141537—TIPO—Jul. 15, 2013.

* cited by examiner

*Primary Examiner* — Xavier Szewai Wong
(74) *Attorney, Agent, or Firm* — Jeffrey D. Jacobs

(57) ABSTRACT

In a synchronous application to control forward link (FL) data rates in a satellite system, user equipment (UE) repeatedly transmits a quality control measurement (QCM) index during a QCM period. During this QCM period, the data rate cannot change. The associated satellite transmits at a new rate corresponding to the QCM index. The UE knows that it will begin receiving new data at the new rate after a QCM delay. In an asynchronous application, a satellite transmits a rate change signal over a FL rate indication channel (RICH). A UE monitors the FL RICH for this signal. When the signal quality is to be low, the satellite sends only a single bit of the QCM index over a first orthogonal channel. When the signal quality is not low, the satellite transmits each bit of the QCM index in a separate orthogonal channel of the FL RICH.

24 Claims, 10 Drawing Sheets

FORWARD LINK DATA RATE CONTROL AND RATE INDICATION FOR SATELLITE-ENABLED COMMUNICATIONS SYSTEMS

TECHNICAL FIELD

The present teachings relate, in general, to communication systems and, more particularly, to forward link data rate control and rate indication in satellite-enabled communication systems.

BACKGROUND

Many current wireless communication systems involve wireless cellular networks. These networks are generally terrestrial radio frequency (RF) networks made up of a number of cells each served by at least one fixed-location transceiver known as a base station. These base stations provide wireless communication links with various mobile devices or user equipment (UE) that pass through the cell served by the particular base station. Advances in terrestrial RF systems have allowed enormous growth and accessibility of wireless voice and data communication to the population and because of the various standardized wireless protocols, the costs for providing such wireless services and UE is relatively low.

One shortcoming of wireless cellular networks is coverage area. In order to maximize the serviceable capacity of any given cell area, the fixed-location base stations are configured to have only a certain, limited range. The limited range allows for reuse of the available channels, which increases the overall capacity of the network. Because a fixed-location base station is used to provide wireless access to the communication system, there can be no service where no base station exists. Moreover, various terrain features, such as trees, mountains, buildings, and the like, can block the RF signals or prohibit installation of the base stations, thus, effectively reducing coverage areas. Therefore, in remote locations, where base stations would be impossible or impracticable to place, a mobile device or UE becomes effectively a paperweight having complex, but still quite useless electronics while in the no-coverage area.

In order to address some of the coverage limits, personal satellite communication systems have been developed. While satellites have been used in backend or backbone communication transmissions for many years, use for personal communication systems has only more recently been implemented. In such satellite systems, a satellite phone or satellite communication device acts as a type of mobile phone that connects to orbiting satellites instead of terrestrial cell sites. Depending on the architecture of a particular system, coverage may include the entire Earth, or only specific regions.

Satellite communication systems experience some of the same shortcomings as terrestrial communication systems, such as signals being blocked by trees, buildings, and the like. However, a satellite communication system can typically provide communication access in extremely remote locations, as long as the location is visible to a certain number of orbiting satellites. Thus, where a terrestrial communication system would typically fail to provide access in the middle of the ocean, or particular dessert or mountain range, a satellite communication system will generally provide communication through signals communicated directly between the UEs and one or more orbiting communication satellites.

While terrestrial wireless communication systems have taken off and become very widespread around the world, satellite communication systems have failed to enjoy similar success likely because of the large initial start up costs for the communication companies to deploy the requisite number of satellites into orbit and, for the user, because of the relatively high costs of the associated mobile devices/UEs, as well as high usage costs, sometimes adding up to several U.S. dollars per minute. However, as wireless technology has advanced, it has become feasible to share mobile hardware for processing both terrestrial and satellite communications. Moreover, hybrid terrestrial-satellite communication systems have been suggested that provide for a mobile phone or UE to use terrestrial base stations when practical, but then switch to satellite stations when the mobile phone or UE is no longer able to reliably couple to the terrestrial base station.

One issue that arises in pure satellite or hybrid terrestrial-satellite systems is adapting the various terrestrial wireless standards to satellite operations. Adaptation of these standards allows more of the same UE technology to be used, "as is," or with only slight changes in order to be compatible between both the terrestrial and satellite systems. Fewer or no changes equates to lower costs for and higher access to the satellite systems. Problems often arise, however, in adapting the terrestrial standards to satellite operations because satellites are simply much further away from the average user than a typical terrestrial base station. The sheer distance affects satellite signals through signal strength and long roundtrip delays. Weaker signals equate to lower data rates, while roundtrip delays can be up to 500 ms compared to terrestrial roundtrip delay times at less than 20 ms.

BRIEF SUMMARY

The various embodiments of the present teachings are directed to forward link rate control in satellite communication systems. In a synchronous application, a user equipment (UE) embeds a quality control measurement (QCM) index into each frame that it sends during a QCM period. During this QCM period, the UE knows that the data rate cannot change. The satellite combines the QCM indices over the QCM period and transmits data at a new rate corresponding to the QCM index. The UE knows that, after the expiration of a QCM delay, it will begin receiving the new data at the new rate. In an asynchronous application, the satellite base station transmits a rate change signal over a dedicated FL rate indication channel (RICH). An associated UE monitors this FL RICH in order to determine when a rate change will occur. When the signal quality is to be low, the satellite base station sends only a single bit of the QCM index over a first orthogonal channel. When the signal quality is normal or high, the base station uses all of the bits of the QCM index transmitting each bit in a separate orthogonal channel of the FL RICH.

Additional representative embodiments of the present teachings are directed to methods for synchronously controlling a FL data rate in satellite communications. These methods include measuring a signal quality on a FL signal, predicting a future signal quality based on the measured signal quality, creating a QCM index corresponding to the future signal quality, repeatedly transmitting the QCM index to a satellite base station during a QCM period, preparing to receive new data signals at a new data rate related to the QCM index after a QCM delay period, and, after expiration of the QCM delay period, receiving the new data signals at the new data rate.

Further representative embodiments of the present teachings are directed to satellite-enabled mobile devices that include a processor, a mo/dem coupled to the processor, a transceiver coupled to the processor, an antenna array coupled to the transceiver, a storage memory coupled to the processor, and a data rate manager stored on the storage memory. When executed by the processor, the data rate manager configures the satellite-enabled mobile device to repeatedly embed a QCM index into each of a plurality of frames transmitted to an associated satellite base station during a QCM period, wherein the QCM index represents a new data rate. The executing data rate manager further configures the mobile device to prepare itself to receive new data signals at the new data rate after a QCM delay stored on the storage memory and, after expiration of the QCM delay, the executing data rate manager configures the mobile device to receive the new data signals at the new data rate.

Still further representative embodiments of the present teachings are directed to computer-readable media that include program code stored thereon. This computer-readable media includes program code to measure a signal quality on a FL signal, program code to predict a future signal quality based on the measured signal quality, program code to create a QCM index corresponding to the future signal quality, program code to repeatedly transmit the QCM index to a satellite base station during a QCM period, program code to prepare to receive new data signals at a new data rate related to the QCM index after a QCM delay period, and program code to receive the new data signals at the new data rate after expiration of the QCM delay period.

Still further representative embodiments of the present teachings are directed to systems to synchronously control a FL data rate in satellite communications. These systems include means for measuring a signal quality on a FL signal, means for predicting a future signal quality based on the measured signal quality, means for creating a QCM index corresponding to the future signal quality, means for repeatedly transmitting the QCM index to a satellite base station during a QCM period, means for preparing to receive new data signals at a new data rate related to the QCM index after a QCM delay period, and means, after expiration of the QCM delay period, for receiving the new data signals at the new data rate.

Still further representative embodiments of the present teachings are directed to methods for synchronously controlling a FL data rate in satellite communications. These methods include transmitting an FL signal to an associated UE, receiving a first frame from the associated UE containing a QCM symbol associated with a new data rate, prohibiting modification of a current data rate for a QCM period, responsive to receiving the first frame, repeatedly receiving the QCM symbol in each of a plurality of subsequent frames received from the associated UE during the QCM period, and transmitting, after expiration of the QCM period, new data signals to the associated UE at a new data rate related to the QCM symbol.

Still further representative embodiments of the present teachings are directed to satellite base stations that include a processor, a mo/dem coupled to the processor, a transceiver coupled to the processor, an antenna array coupled to the transceiver, a storage memory coupled to the processor, and a data rate controller module stored on the storage memory. When executed by the processor, the data rate controller module configures the satellite base station to prohibit change to a current data rate for during of a QCM period responsive to receiving a first frame from an associated UE containing a QCM symbol associated to a new data rate, to repeatedly receive the QCM symbol in each of a plurality of subsequent frames received from the associated UE during the QCM period, and to transmit, after expiration of the QCM period, new data signals to the associated UE at a new data rate related to the QCM symbol.

Still further representative embodiments of the present teachings are directed to computer-readable media having program code stored thereon. These computer-readable media include program code to transmit an FL signal to an associated UE, receiving a first frame from the associated UE containing a QCM symbol associated with a new data rate, program code, executable responsive to receiving the first frame, to prohibit modification of a current data rate for a QCM period, program code to repeatedly receive the QCM symbol in each of a plurality of subsequent frames received from the associated UE during the QCM period, and program code to transmit, after expiration of the QCM period, new data signals to the associated UE at a new data rate related to the QCM symbol.

Still further representative embodiments of the present teachings are directed to systems to synchronously controlling a FL data rate in satellite communications. These systems include means for transmitting an FL signal to an associated UE, means for receiving a first frame from the associated UE containing a QCM symbol associated with a new data rate, means, executable responsive to receiving the first frame, for prohibiting modification of a current data rate for a QCM period, means for repeatedly receiving the QCM symbol in each of a plurality of subsequent frames received from the associated UE during the QCM period, and means for transmitting, after expiration of the QCM period, new data signals to the associated UE at a new data rate related to the QCM symbol.

Still further representative embodiments of the present teachings are directed to methods for asynchronously controlling a FL data rate in satellite communications. These methods include monitoring a FL RICH for a rate change signal, detecting the rate change signal on the FL RICH, preparing to receive new data signals at a new low data rate, responsive to the rate change signal comprising a single bit transmitted on a first orthogonal channel, and preparing to receive new data signals at a new high data rate, responsive to the rate change signal comprising a multiple bit signal, wherein each of the multiple bits is transmitted on a corresponding one of a plurality of orthogonal channels.

Still further representative embodiments of the present teachings are directed to satellite-enabled mobile devices that include a processor, a mo/dem coupled to the processor, a transceiver coupled to the processor, an antenna array coupled to the transceiver, a storage memory coupled to the processor, and a FL RICH monitor module stored on the storage memory. When executed by the processor, the FL RICH monitor module configures the satellite-enabled mobile device to monitor a FL RICH for a rate change signal. The mobile devices further include a data rate manager module stored on the storage memory. When executed by the processor, the data rate manager module configures the satellite-enabled mobile device to prepare the satellite-enabled mobile device to receive new data at a new low data rate, responsive to a detected rate change signal comprising a single bit transmitted on a first orthogonal channel and to prepare the satellite-enabled mobile device to receive new data at a new high data rate, responsive to the detected rate change signal comprising a multiple bit signal, wherein each of the multiple bits is transmitted on a corresponding one of a plurality of orthogonal channels.

Still further representative embodiments of the present teachings are directed to computer-readable media that have program code stored thereon. The computer-readable media include program code to monitor a FL RICH for a rate change signal, program code to detect the rate change signal on the FL RICH, program code, executable responsive to the rate change signal comprising a single bit transmitted on a first orthogonal channel, to prepare a satellite-enabled mobile device to receive new data signals at a new low data rate, and program code, executable responsive to the rate change signal comprising a multiple bit signal, wherein each of the multiple bits is transmitted on a corresponding one of a plurality of orthogonal channels, to prepare the satellite-enabled mobile device to receive new data signals at a new high data rate.

Still further representative embodiments of the present teachings are directed to systems to asynchronously control a FL data rate in satellite communications. These systems include means for monitoring a FL RICH for a rate change signal, means for detecting the rate change signal on the FL RICH, means, executable responsive to the rate change signal comprising a single bit transmitted on a first orthogonal channel, for preparing to receive new data signals at a new low data rate, and means, executable responsive to the rate change signal comprising a multiple bit signal, wherein each of the multiple bits is transmitted on a corresponding one of a plurality of orthogonal channels, for preparing to receive new data signals at a new high data rate.

Still further representative embodiments of the present teachings are directed to methods for asynchronously controlling a FL data rate in satellite communications. These methods include analyzing a value of a QCM index, transmitting a single bit of the QCM index on a first orthogonal channel of a FL RICH, responsive to the value indicating a low data rate, and transmitting each of a plurality of bits of the QCM index on a corresponding one of a plurality of orthogonal channels of the FL RICH, responsive to the value indicating a high data rate.

Still further representative embodiments of the present teachings are directed to satellite base stations that include a processor, a mo/dem coupled to the processor, a transceiver coupled to the processor, an antenna array coupled to the transceiver, a storage memory coupled to the processor, and a data rate controller module stored on the storage memory. When executed by the processor, the data rate controller module configures the satellite base station to analyze a value of a QCM index, to transmit, responsive to the value indicating a low data rate, a single bit of the QCM index on a first orthogonal channel of a FL RICH, and to transmit, responsive to the value indicating a high data rate, each of a plurality of bits of the QCM index on a corresponding one of a plurality of orthogonal channels of the FL RICH.

Still further representative embodiments of the present teachings are directed to computer-readable media that have program code stored thereon. This computer-readable media includes program code to analyzing a value of a QCM index, program code, executable responsive to the value indicating a low data rate, to transmit a single bit of the QCM index on a first orthogonal channel of a FL RICH, and program code, executable responsive to the value indicating a high data rate, to transmit each of a plurality of bits of the QCM index on a corresponding one of a plurality of orthogonal channels of the FL RICH.

Still further representative embodiments of the present teachings are directed to systems to asynchronously control a FL data rate in satellite communications. These systems include means for analyzing a value of a QCM index, means, executable responsive to the value indicating a low data rate, for transmitting a single bit of the QCM index on a first orthogonal channel of a FL RICH, and means, responsive to the value indicating a high data rate, for transmitting each of a plurality of bits of the QCM index on a corresponding one of a plurality of orthogonal channels of the FL RICH.

The foregoing has outlined rather broadly the features and technical advantages of the present invention in order that the detailed description that follows may be better understood. Additional features and advantages will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the technology of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings.

DETAILED DESCRIPTION

Figure 1:
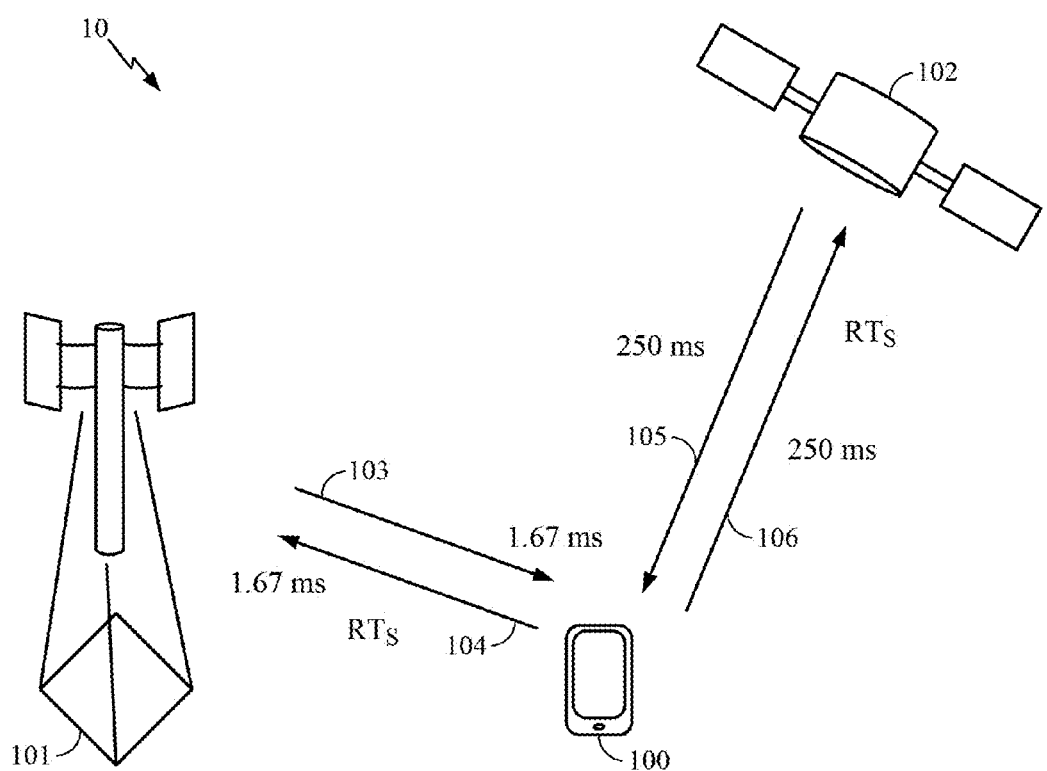
FIG. 1 is a block diagram illustrating a hybrid terrestrial-satellite communication system (HCS) configured according to one embodiment of the present teachings.

One protocol that offers beneficial adaptation to satellite communication systems is the evolution-data optimized (EVDO) standard for the wireless transmission of data through radio signals developed by Qualcomm, Inc. The EVDO standard uses multiplexing techniques including code division multiple access (CDMA) as well as time division multiple access (TDMA) to maximize both individual user throughput and the overall system throughput. It is standardized by the 3rd Generation Partnership Project 2 (3GPP2) as part of the CDMA2000 family of standards and has been adopted by many mobile phone service providers around the world—particularly those previously employing CDMA networks.

A beneficial feature of EVDO is the ability of the UE to signal the base station to change data rates depending on the detected quality of the signal channel. The UE will generally measure the signal strength or quality of the forward link (FL) channel and, based on that measurement, will predict a future signal strength/quality. In order to determine the strength or quality of the channel, the UE will typically measure the signal-to-noise ratio (SNR), signal-to-interference plus noise ratio (SINR), signal-to-noise plus distortion ratio (SNDR), and the like. Based on that measurement, a future signal quality is predicted using various processes known in the art. These predictions generally are translated or correspond to a quality control measurement (QCM) index. Examples of QCM indices include data rate control (DRC) values, channel quality indicators (CQIs), and the like. The EVDO protocol generally uses a 4-bit QCM index that the UE will transmit back to the base station. Often, the QCM index will be processed into a QCM symbol or other such format for transmitting the QCM information. The base station receives the QCM symbol, demodulates it into the QCM index, and, based on the QCM index value, changes the data rate (along with other parameters, such as the number of slots scheduled, payload size, code rate, and modulation scheme) and immediately begins transmitting the data to the UE at the new data rate.

In EVDO, data is sent in units of time slots or slots. Each slot is 1.67 ms long. After the UE measures the FL signal quality, estimates a future signal quality, and selects the QCM index, it processes the QCM index into a QCM symbol and embeds the QCM symbol into a slot in the media access control (MAC) channel. This slot is then transmitted to the base station. In a typical terrestrial EVDO network, the UE will then expect to begin receiving data at the new data rate after the next slot or 1.67 ms. However, with the inclusion of a satellite access node into the communication system, a single leg on the trip from device to satellite will typically take around 250 ms or more. Therefore, in a satellite or hybrid terrestrial-satellite network, when a UE transmits a QCM symbol, the UE could, typically, not even receive the new data at the new data rate for at least 500 ms.

In order to overcome these deficiencies in applying terrestrial standards, such as the EVDO standard to satellite and hybrid terrestrial-satellite communication systems, the various embodiments of the present teachings may be divided into two categories: synchronous adaptation and asynchronous adaptation. Each of these categories of the present teachings offers solutions to incorporating terrestrial standards into satellite communications systems.

Synchronous Adaptation.

Due to link budget limitations in satellite-enabled networks, reception of the QCM symbol embedded in one or two frames may not result in reliable demodulation of the QCM symbol into the QCM index. In order to solve this shortcoming, various embodiments of the present teachings provide for repeating the same QCM symbol several times over multiple frame cycles to allow error-correcting combination at the satellite. The error-correcting combination of multiple copies of the QCM symbol allows a more accurate and reliable determination of the QCM index. Such combining may be performed using coherent or non-coherent error-correcting combination techniques. The time period during which the UE will continue to repeat the same QCM index is referred to as the QCM period. The length of the QCM period is established based on the amount of time or number of slots that it will take to accurately and reliably determine the QCM index. Because this QCM period is used to determine what the QCM index is, no changes are allowed to the data rate during this time. The institution of this time period during which no data rate changes are allowed, replaces the UE expectation that it will begin receiving data at the new data rate 1.67 ms after transmitting the QCM symbol, as in the terrestrial configuration.

In addition to the QCM period, another parameter created in the various embodiments of the present teachings, QCM delay, which represents the time period or number of frames from the time that the UE first transmits the QCM symbol until the updated data rate will go into effect. In general, the QCM delay is calculated by adding the maximum roundtrip path delay, including the maximum two-way satellite path time plus any processing delay in the satellite, with the QCM period.

The design of the QCM period and QCM delay takes into consideration the worst-case scenario in communication between the UEs and the satellites. The worst-case scenarios include the maximum distance between the satellite and the UE, the maximum processing time, the worst case time for the satellite access node to reliably demodulate the QCM signals, and other such "extreme" assumptions. In many situations, the actual timing for this communication will be less. However, in order to ensure reliable communication, these worst-cases are considered. In one embodiment of the present teachings, the default QCM period is set to be 20 frames (i.e., about 400 ms). The maximum path delay with the maximum processing time is set to be 30 frames (i.e., about 600 ms). Therefore, the default QCM delay is equal to 50 frames (i.e., about 1 s). Setting these default values allows the absolute worst-case situation to result in successful data communication.

Turning now to FIG. 1, a block diagram is shown illustrating a hybrid terrestrial-satellite communication system (HCS) 10 configured according to one embodiment of the present teachings. A UE 100 operates EVDO within the HCS 10. When coupled to the HCS 10 through a terrestrial base station 101, the UE 100 communicates with the terrestrial base station 101 through forward link (FL) signals, such as a FL 103, and reverse link (RL) signals, such as a RL 104. The UE 100 measures the SINR on the FL 103 and estimates a QCM index (e.g., a DRC index or CQI index) for transmission back to the base station 101 through the RL 104. The UE 100 expects to begin receiving data at the new rate in 1.67 ms.

As the UE 100 transitions its connection from the terrestrial connection with the base station 101 to a satellite connection with a satellite 102, operations begin to change. The satellite 102 transmits a FL 105 to the UE 100 which analyzes for the quality of the radio channel in the FL 105. The UE 100 predicts a future quality of the channel, creates a QCM index (e.g., a CQI or DRC index) corresponding to a new data rate, and transmits the QCM to the satellite 102 using the RL 106. With the transmission of the QCM, a QCM period begins, during which time the UE 100 places the same QCM information on each transmitted frame and no changes to the data rate may be made by the satellite 102. The satellite 102 receives the QCM frame and begins extracting the QCM information. The satellite 102 will continue to extract and combine the QCM information in an error checking process in order to improve its reliability during the course of the QCM period.

When in the terrestrial mode, the UE 100 knows that it will begin receiving data at the new data rate in 1.67 ms from transmitting the QCM index. In order for the satellite 102 to receive the QCM and begin transmitting at a new data rate, at least one roundtrip needs to occur. The QCM delay begins and is set to be the QCM period plus a maximum roundtrip and any satellite processing time.

Figure 2:
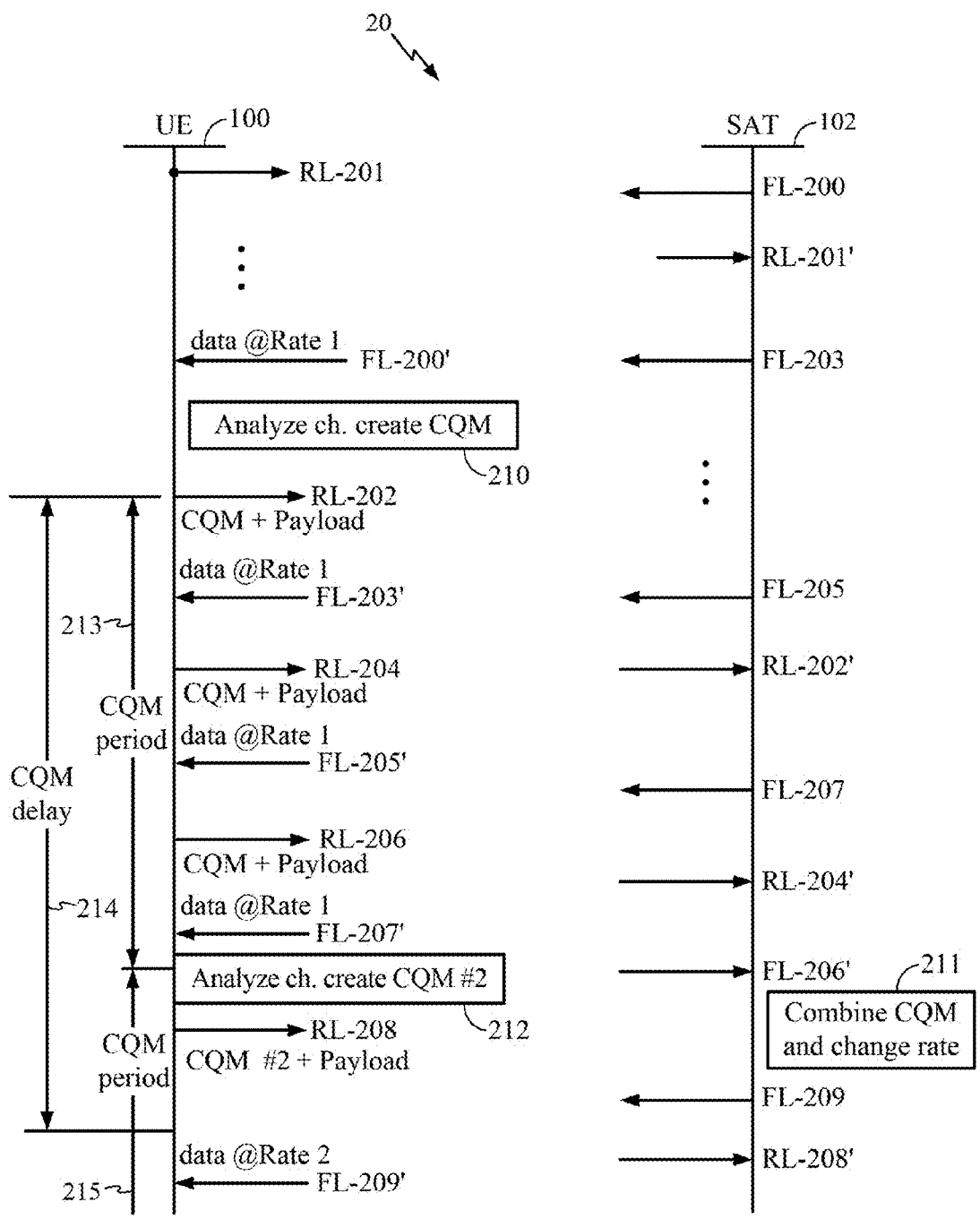
FIG. 2 is a signal diagram representing forward and reverse link signals communicated between a UE and a satellite in a communication system configured according to one embodiment of the present teachings.

FIG. 2 is a signal diagram 20 representing forward and reverse link signals communicated between a UE 100 and a satellite 102 in a communication system configured according to one embodiment of the present teachings. The satellite 102 transmits a forward link (FL) signal 200 to the UE 100. Because of the lag time between the satellite 102 and the UE 100, the UE 100 receives FL-200' at a later time corresponding to the lag time. After transmitting FL-200, the satellite receives a reverse link (RL) signal, RL-201', from the UE 100. The UE 100 transmitted RL-201 chronologically before the satellite 102 transmitted FL-200 to the UE 100, but because of the distance, receives RL-201' after transmitting FL-200.

At the UE 100, the UE 100 analyzes the FL channel that FL-200' arrived on to determine the channel quality. The UE 100 uses known processes to predict a future channel quality and generates a QCM for this prediction in 210. The UE 100 packages the QCM along with its data payload and transmits RL-202 to the satellite 102. The QCM embedded in the RL-202 indicates for the satellite 102 to begin transmitting at a different data rate than the rate at which FL-200 was sent. As the UE 100 transmits RL-202 including the new QCM, a QCM period 213 beings, during which the data rate from the satellite 102 cannot be changed. RL-202 also marks the beginning of a QCM delay 214. The QCM delay 214 marks the time when the UE 100 will expect to begin receiving transmissions from the satellite 102 at the new data rate.

When the satellite 102 receives RL-202', it has already sent FLs-203 and 205 at the current data rate. The UE 100 receives FLs-203' and 205' during the QCM period 213. The UE 100 transmits another signal, RL-204 that includes the same QCM data plus its payload data. The satellite 102 receives this RL-204' and pulls out the QCM data to combine with the QCM data from RL-202'. The UE 100 is sending the same QCM data in RLs-202 and 204. By accumulating and combining the QCM data, the satellite 102 is able to essentially error check the QCM data, making it more accurate and reliable. The satellite 102 transmits data at the same rate in FL-207, prior to receiving RL-204' from the UE 100. The UE 100 receives FL-207' just after transmitting another signal, RL-206, which includes the same QCM data and additional payload. The UE 100 again analyzes the FL channel from FL-207' and generates a new QCM in 212, QCM #2, and transmits RL-208 into which QCM #2 is embedded in the next payload data. At this point, the QCM period 213 ends and a new QCM period 215 begins. The satellite 102 is also aware, as it receives RL-206', that the QCM period 213 has expired. It, again, extracts and combines the QCM data in 211 and changes the data rate. The satellite then transmits FL-209 at the new data rate. The UE 100 receives this data in FL-209', thus, completing one cycle in the variable data rate.

This synchronous system allows for the variable data rate scheme of EVDO to be realized in communication systems that include satellite nodes. However, because of the long round trip times and the design of the QCM period 213 and QCM delay 214 according to the worst-case scenario, this synchronous system enables such variable rate changes very slowly.

Figure 5A:
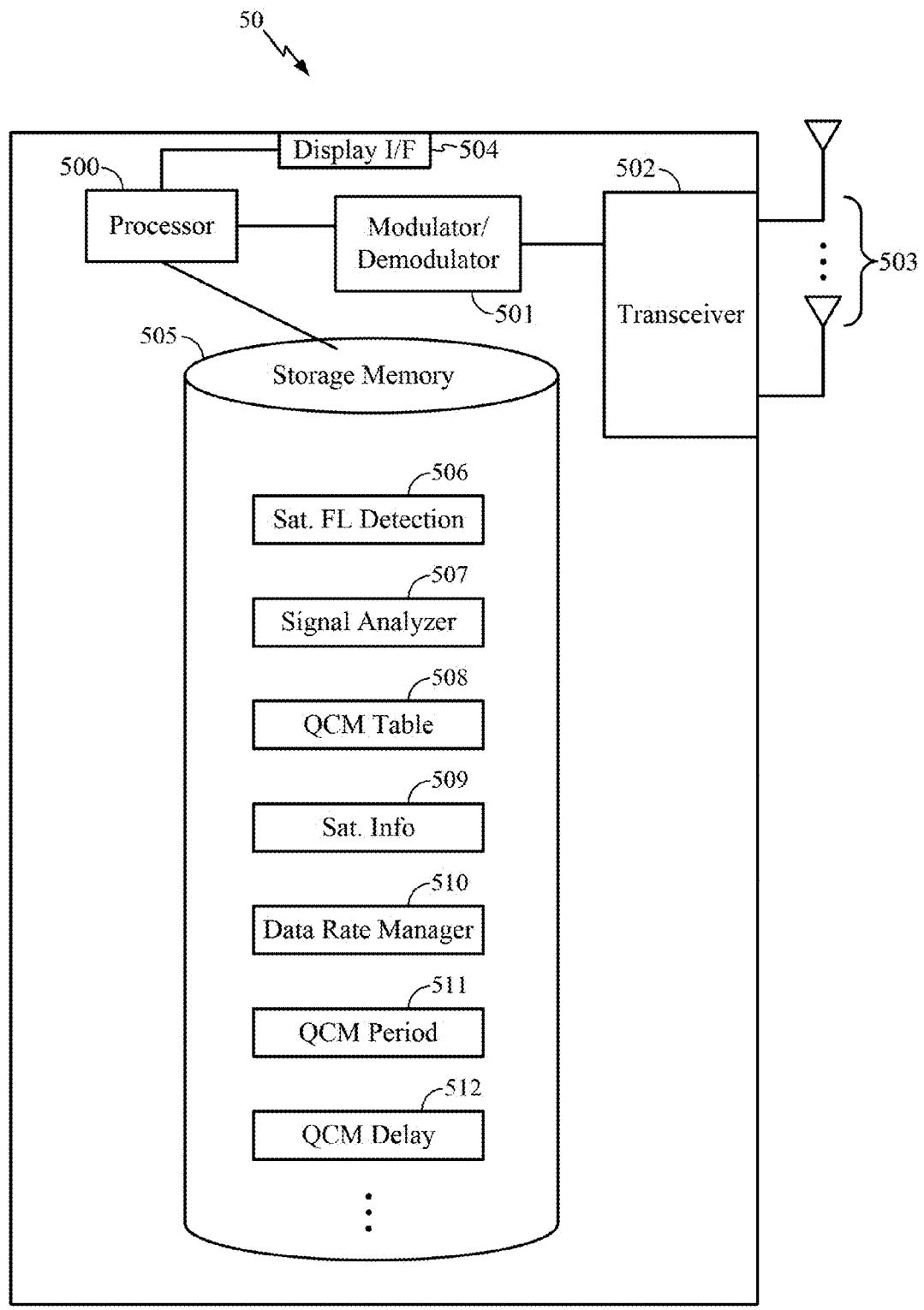
FIGS. 5A and 5B are a block diagrams illustrating satellite-enabled mobile devices configured according to different embodiments of the present teachings.

FIG. 5A is a block diagram illustrating a satellite-enabled mobile device 50 configured according to one embodiment of the present teachings. The satellite-enabled mobile device 50 includes a processor 500, a modulator/demodulator (mo/dem) 501, a transceiver 502 coupled for operation of an antenna array 503, a display interface 504, and a storage memory 505. The processor 500 executes software code from the storage memory 505 to operate the satellite-enabled mobile device 50 in a synchronous adaptation to a communication standard created for terrestrial-only communication networks. A satellite forward link detection module 506, when executed by the processor 500, allows the satellite-enabled mobile device 50 to detect when FL signals originate from a terrestrial base station or a satellite base station. This detection may take various different forms including reading codes or symbols appended to the signal that indicates the origin of the signal is a satellite. The detection of a satellite base station signal triggers the satellite-enabled mobile device 50 to switch operations to satellite communication. This satellite communication mode triggers the use by the processor 500 of a satellite information module 509, a QCM period 511 stored in the storage memory 505, and a QCM delay 512 stored in the storage memory 505, in addition to using the functions associated with regular terrestrial operation, such as a signal analyzer module 507, a QCM table 508, and a data rate manager 510.

Upon receipt and detection of an FL from a relevant satellite, the processor executes signal analyzer module 507 which measures the quality or strength of the FL signal. The functionality of the executed signal analyzer module 507 may also use the satellite information module 509, which would include information such as the satellite almanac, ephemeris data, and the like, to analyze the FL signal. The executed signal analyzer module 507 also predicts a future signal quality using the measured signal quality. Based on the predicted quality, the processor 500 uses the QCM table 508 to select a QCM index that corresponds to the predicted quality. The processor 500 sends the QCM index to the mo/dem 501 to be modulated into a QCM symbol that will be embedded in one of the transmitted frames. This frame with the embedded QCM symbol is then modulated, by mo/dem 501, and transmitted by the transceiver 502 using the antenna array 503.

When the QCM symbol is transmitted, the data rate manager 510 uses the period identified in the QCM period 511 to signal the processor 500 to embed the same QCM symbol in each frame that is transmitted over the QCM period 511. The data rate manager 510 also signals the processor 500 that a new FL signal at a new data rate will not be received until the expiration of another period defined by the QCM delay 512.

Figure 6A:
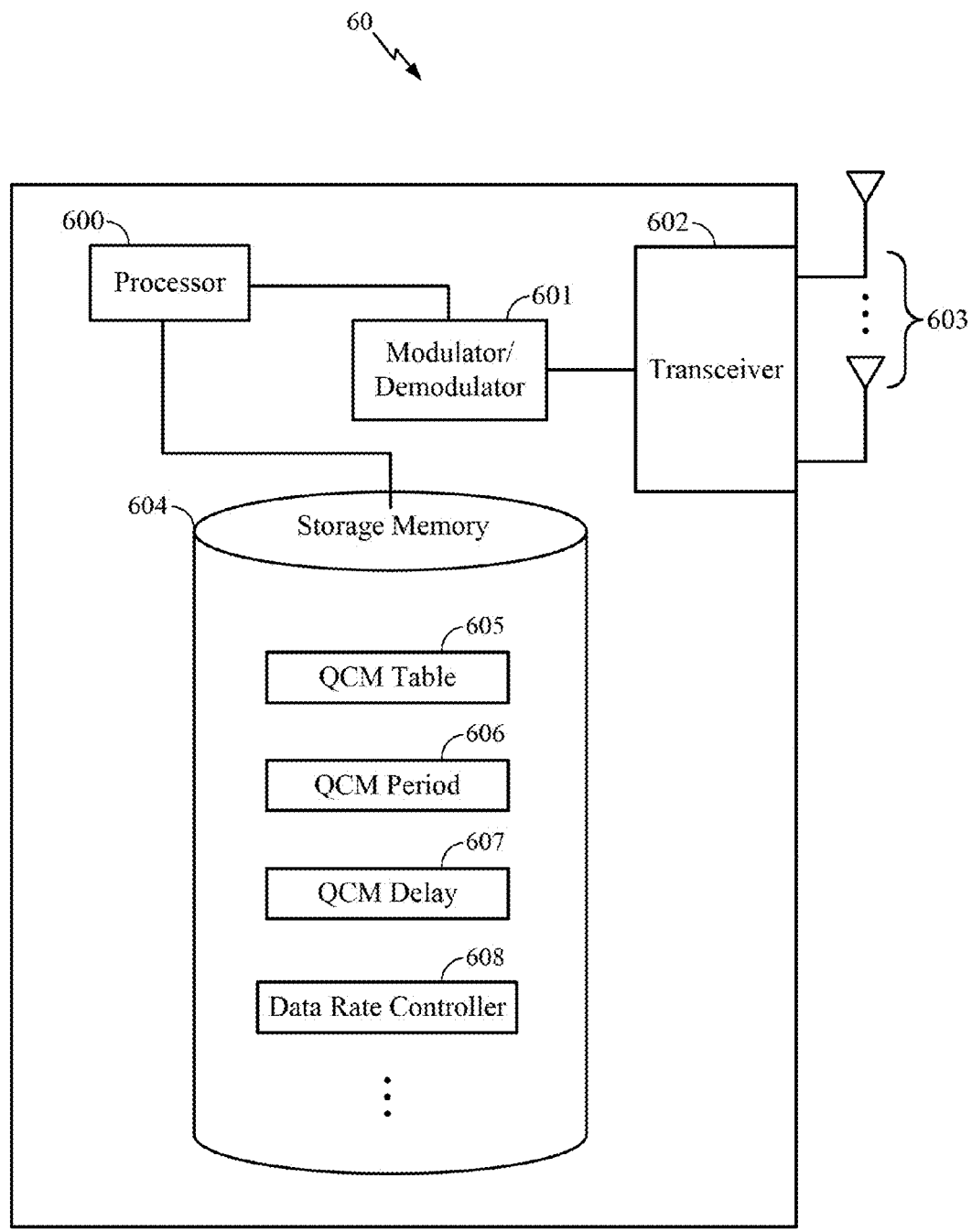
FIGS. 6A and 6B are block diagrams illustrating satellite base stations configured according to different embodiments of the present teachings.

FIG. 6A is a block diagram illustrating a satellite base station 60 configured according to one embodiment of the present teachings. The satellite base station includes a processor 600, a mo/dem 601, a transceiver 602 coupled for operation of an antenna array 603, and a storage memory 604. The processor 600 executes software modules or functions stored on the storage memory 604 in order to provide the functionality of the satellite base station 60. The processor 600 executes the data rate controller 608, stored on the storage memory 604, to change the data rate at which data is communicated with an associated UE. The specific rate at which data will be transmitted is governed by QCM indices, which are stored in a QCM table 605.

In operation, when the satellite base station 60 receives a transmitted frame from an associated UE via the antenna array 603, the received signal is processed by the transceiver 602 and demodulated by the mo/dem 601. The processor 600 executing the data rate controller 608 continues by extracting the QCM index from the transmitted frame. This extracted QCM index is stored in the storage memory 604 and the QCM period 606 is used to restrict the executing data rate controller 608 from changing the data rate until the expiration of the QCM period 606. The executing data rate controller 608 also informs the satellite base station 60 that the QCM index will be embedded in each frame transmitted from the associated UE during the QCM period 606. With each received frame transmitted during the QCM period 606, the extracted QCM index is stored in the storage memory 604 and the processor 600 combines each stored copy of the QCM index in order to arrive at an accurate index value.

Once the QCM period lapses, the executing data rate controller 608 uses the QCM table 605 to look up the data rate corresponding to the QCM index and begin transmitting data to the associated UE at the new data rate. These new data packages will then arrive at the associated UE according to the QCM delay 607, at which time the associated UE is expecting to receive the data at this new rate.

The operations of the satellite-enabled mobile device 50 (FIG. 5A) and the satellite base station 60 (FIG. 6A) implement the synchronous adaptation variety of communications systems defined by different embodiments of the present invention. The implementation of the asynchronous adaptation systems operates in a different manner.

Asynchronous Adaptation.

Figure 3:
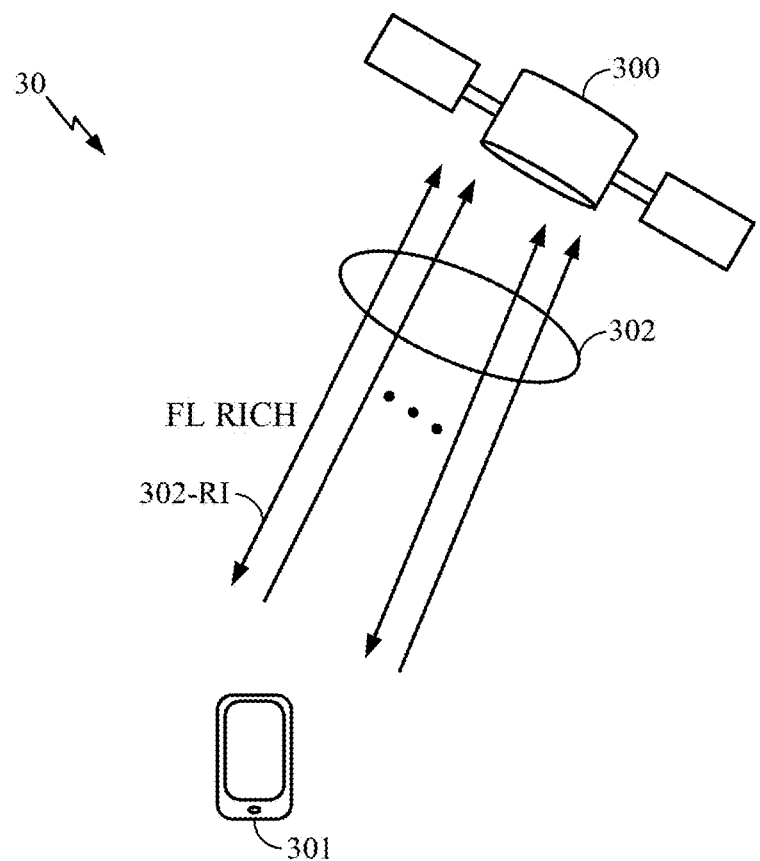
FIG. 3 is a block diagram illustrating a communication system configured according to one embodiment of the present teachings.

FIG. 3 is a block diagram illustrating a communication system 30 configured according to one embodiment of the present teachings. The communication system 30 is configured such that a satellite 300 is tasked with detecting the quality of the communication channel instead of a user device, such as the user device 301. Communication between the satellite 300 and the user device 301 occurs through a number of specific communication channels 302. According to the configuration of communication system 30, the communication channels 302 include forward link (FL) rate indication channel (RICH) 302-RI. The user device 301 monitors this channel to determine when the data rate is going to change.

In example operation, the satellite 300 analyzes the quality of one of the communication channels 302 in its RL communications with user device 301. If the quality of the channel has diminished by a certain amount, the satellite 300 will transmit a data change signal on FL RICH 302-RI just prior to changing its data transmission rate. The user device 301 monitors the FL RICH 302-RI, detects this change signal, and configures itself to receive the next data from the satellite 300 at the new data rate. This asynchronous system allows for data rates to change more readily in response to changing channel conditions. However, implementing the asynchronous system in an efficient manner involves appropriate signaling schemes that can leverage existing EVDO standards, such as the QCM value, yet still accommodate the differences experienced with the satellite communication applications.

In terrestrial EVDO communications, part of the error checking performed on the communication is accomplished through automatic repeat request (ARQ). ARQ uses acknowledgement signals and timing out to validate communications over an otherwise low-reliability network. However, in satellite communications, because the roundtrip delay is so much greater, ARQ is not used. Therefore, the various ARQ bits and ARQ-related MAC channels are not used in the satellite-enabled EVDO communications. These unused MAC channels are redefined in various embodiments of the present teachings to accommodate delivery of a QCM value from the satellites to the user devices.

Thus, in order to implement the asynchronous rate change system in satellite-enabled communication networks, the rate change signals over the FL RICH 302-RI should use at most 4 bits from the QCM mechanism to control the rate change. To effectively communicate the rate information in a satellite-enabled network, the rate information should be transmitted as a part of every packet sent on the FL. By including the rate information in each packet, the rate information can be sent in the same slot as the data or a few slots before the data begins.

Because the satellite portions of the communication systems do not use the ARQ-related MAC channels, the various systems of the present teachings may leverage those unused MAC channels not only for the FL RICH, but also for designating each of the 4-bits of the QCM. In the various embodiments of the present invention, five Walsh channels are used for transmission of the QCM from a satellite to a mobile device.

Given conventional bandwidth limitations, EVDO has 128 available FL MAC channels that correspond to 128 Walsh channels or codes. Walsh codes are mathematically orthogonal codes to uniquely define different communication channels. 128 such channels are available to the FL MAC, so the various embodiments of the present teachings will use five such Walsh channels to implement the rate information delivery system.

Figure 4A:
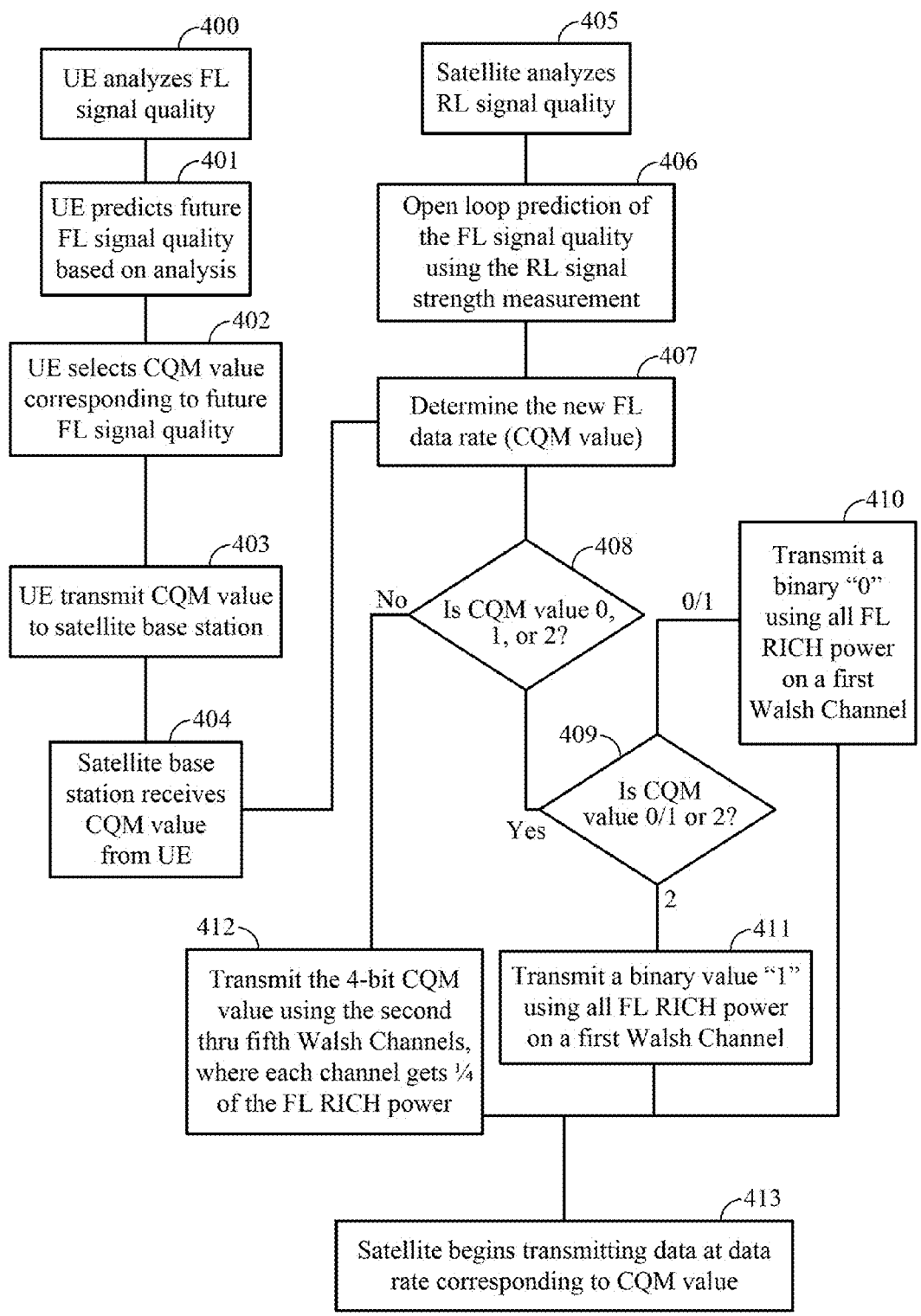
FIG. 4A is an operational block diagram illustrating operational blocks defining functionality of one embodiment of the present teachings.

FIG. 4A is an operational block diagram illustrating operations blocks defining functionality of one embodiment of the present teachings. In block 400, a UE analyzes the signal quality of a FL signal. The UE predicts a future FL signal quality, in block 401, based on the analyzed signal quality. The UE selects a QCM value that corresponds to the future FL signal quality in block 402. In block 403, the UE transmits the QCM value to a satellite base station. The satellite base station receives this QCM value in block 404.

In the operation of operational blocks 400 through 404, the process is similar to many existing processes in which the UE measures the quality of the FL signal, predicts a future quality, and transmits a QCM value based on the predicted future quality. In the embodiment described in FIG. 4A, however, the satellite base station is also configured with the capability to analyze the quality of the reverse link (RL) signals. It may then assume that the quality of the RL signal and the FL signal have a certainly correlation, such that an open loop prediction, which uses the RL signal strength measurements to predict an FL signal strength, is feasible.

As such, in block 405, the satellite base station analyzes the RL signal quality. The satellite base station conducts an open loop prediction of future quality of the FL signals in block 406. The result of the open loop prediction and the received QCM value from the UE are both taken into consideration by the satellite when selecting a new QCM value, in block 407. In block 408, which occurs regardless of whether the QCM value is received from a UE or selected by the satellite base station itself, a determination is made as to whether the QCM value is a 0, 1, or 2, i.e., a value that represents a low data rate. If the QCM value is either 0, 1, or 2, another determination is made in block 409 as to whether the QCM value is a 0 or 1 or whether the value is a 2. If the QCM value is a 0 or 1, then the signal strength is considered to be at its weakest and, in block 410, the satellite will send a binary value '0' on a first Walsh channel in the FL RICH as a rate change signal, using all of the power allocated to the FL RICH to send that value. It should be noted that the FL RICH of FIG. 4A is allocated five Walsh channels from the unused MAC channels.

If the QCM value is a 2, then the signal strength is still very weak, but measurably stronger than a QCM value of 0 or 1. In such a case, the satellite sends a binary value '1' on the first Walsh channel of the FL RICH, in block 411, as a rate change signal, again, using all of the power allocated to the FL RICH. By sending a single bit rate change signal using all of the power allocated for the FL RICH, the satellite will maximize the probability that the associated UE will detect the rate change signal on the FL RICH even though the signal strength represented by a QCM 0, 1, or 2 is very weak. In block 412, when the QCM value is greater than 2, the satellite transmits all of the QCM value bits (i.e., 4-bits) as the rate change signal using the second through fifth Walsh channels of the FL RICH. In transmitting all of the QCM value bits, the power allocated to the FL RICH is divided in a pro rata amount to each bit on each Walsh channel. In block 413, after the satellite transmits the rate change signal on the FL RICH according to any of block 410-412, the satellite will then begin transmitting data at the new data rate corresponding to the QCM value.

Figure 4B:
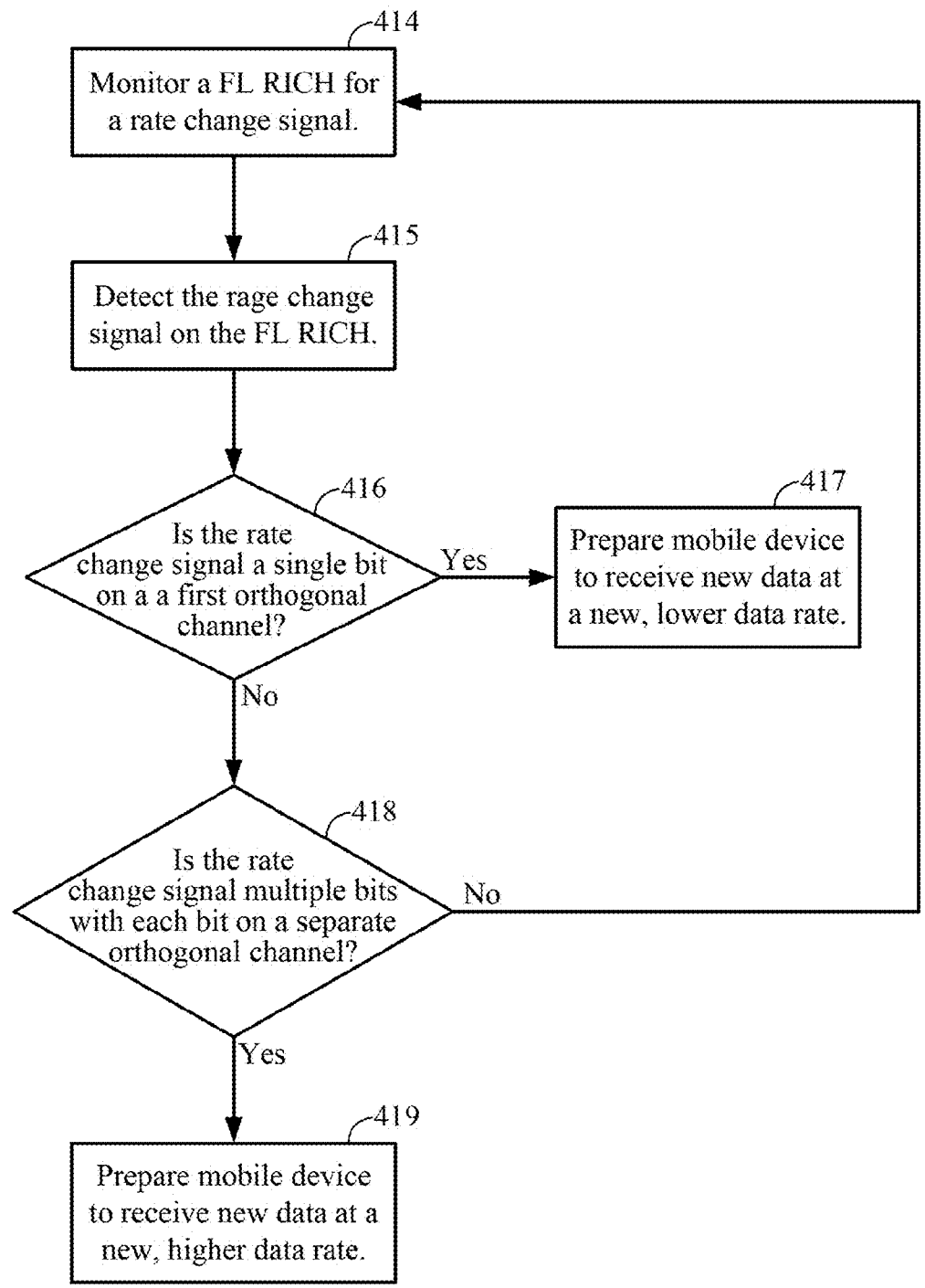
FIG. 4B is an operational block diagram illustrating operational blocks defining functionality of a mobile device configured according to one embodiment of the present teachings.

FIG. 4B is an operational block diagram illustrating operational blocks defining functionality of a mobile device configured according to one embodiment of the present teachings. In block 414, the mobile device monitors the FL RICH for a rate change signal. Once the rate change signal is detected, in block 415, a determination is made, in block 416, whether the rate change signal is a single bit on a first orthogonal channel. If so, then, in block 417, the mobile device prepares itself to begin receiving new data at a new, lower data rate. Otherwise, in block 418, another determination is made whether the rate change signal is multiple bits, where each of the multiple bits are on a separate orthogonal channel. If so, then, in block 419, the mobile device prepares itself to begin receiving new data at a new, higher data rate. Otherwise, the mobile device returns to monitoring the FL RICH in block 414.

Figure 5B:
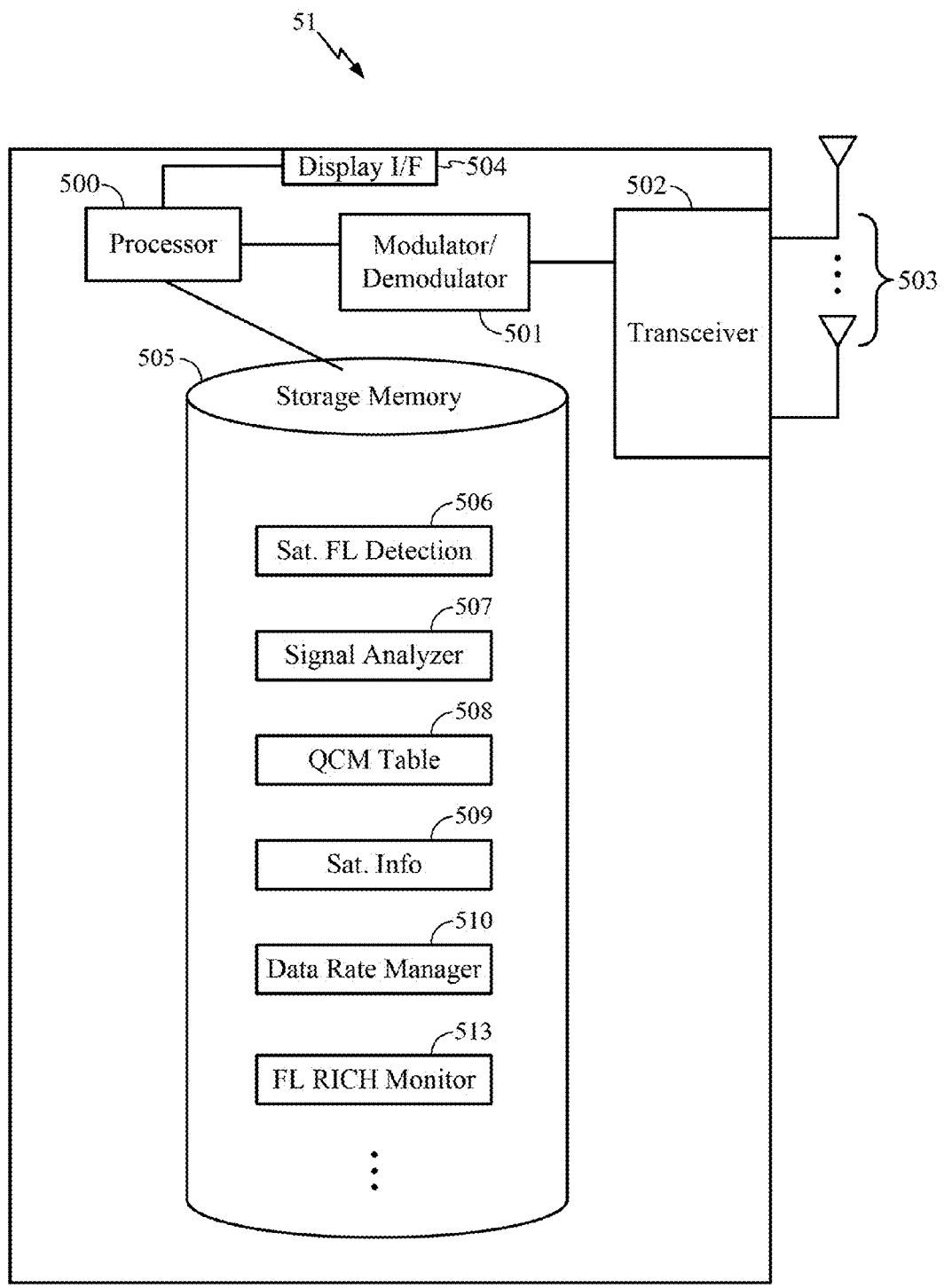

FIG. 5B is a block diagram illustrating a satellite-enabled mobile device 51 configured according to one embodiment of the present teachings. The basic parts of the satellite-enabled mobile device 51 are the same as the satellite-enabled mobile device 50 (FIG. 5A) configured for synchronous adaptation. The satellite-enabled mobile device 51 includes a processor 500, a mo/dem 501, a transceiver 502 coupled to operate an antenna array 503, a display interface 504, and a storage memory 505. The storage memory 505 stores various software modules which, when executed by the processor 500, implement the functionalities of the asynchronous adaptation.

A satellite forward link detection module 506, when executed by processor 500, allows the satellite-enabled mobile device 51 to detect when FL signals originate from a terrestrial base station or a satellite base station, as described with respect to the satellite-enabled mobile device 50 (FIG. 5A). The detection of a satellite base station signal triggers the satellite-enabled mobile device 51 to switch operations to satellite communication. This satellite communication mode triggers the use by the processor 500 of a satellite information module 509 and an FL rate information channel (RICH) monitor 513, in addition to using the functions associated with regular terrestrial operation, such as a signal analyzer module 507, a QCM table 508, and a data rate manager 510.

Depending on the particular wireless standard under which the satellite-enabled mobile device 51 operates, there are various logical channels and configurations that the mobile device 51 will use in order to communicate data, network messages, and the like. The particular standard will be augmented to include the definition of the FL RICH. The definitions provides that rate information signals will pass between any given satellite base station and an associated UE, such as the satellite-enabled mobile device 51, in order to control and managed data rate changes in transmission. The FL RICH monitor 513, when executed by the processor 500, monitors this FL RICH for signals representing coming changes in the transmission data rate. When such rate information signals are received, the satellite-enabled mobile device 51 will know when to expect new data to arrive at the new data rate.

Similar to the satellite-enabled mobile device 50 (FIG. 5A), the satellite-enabled mobile device 51 includes the signal analyzer module 507. When executed by the processor 500, the signal analyzer module 507 analyzes the quality of the signal/channel of the FL signal received from the satellite base station and predicts a future channel quality. Based on the results of the future quality determination, the processor 500 accesses the QCM table 508 to select a corresponding QCM index, which would identify what data rate should be implemented for the future transmission time. This QCM index is converted into a QCM symbol and embedded into data frames for transmission to the associated satellite base station. After the satellite base station receives the QCM symbol and determines the QCM index, it may change the data rate at any time. The change, however, is signaled via the FL RICH. Therefore, when the satellite-enabled mobile device 51 detects the rate change information signal on FL RICH through the executing FL RICH monitor 513, it knows when to expect the next data at the new rate.

It should be noted that the satellite-enabled mobile device 51 does not need to compute the QCM index in order to receive rate change information via the FL RICH. The executing FL RICH monitor 513 simply monitors for the information and, if such information is detected, sets the satellite-enabled mobile device 51 to expect the new data rate.

Figure 6B:
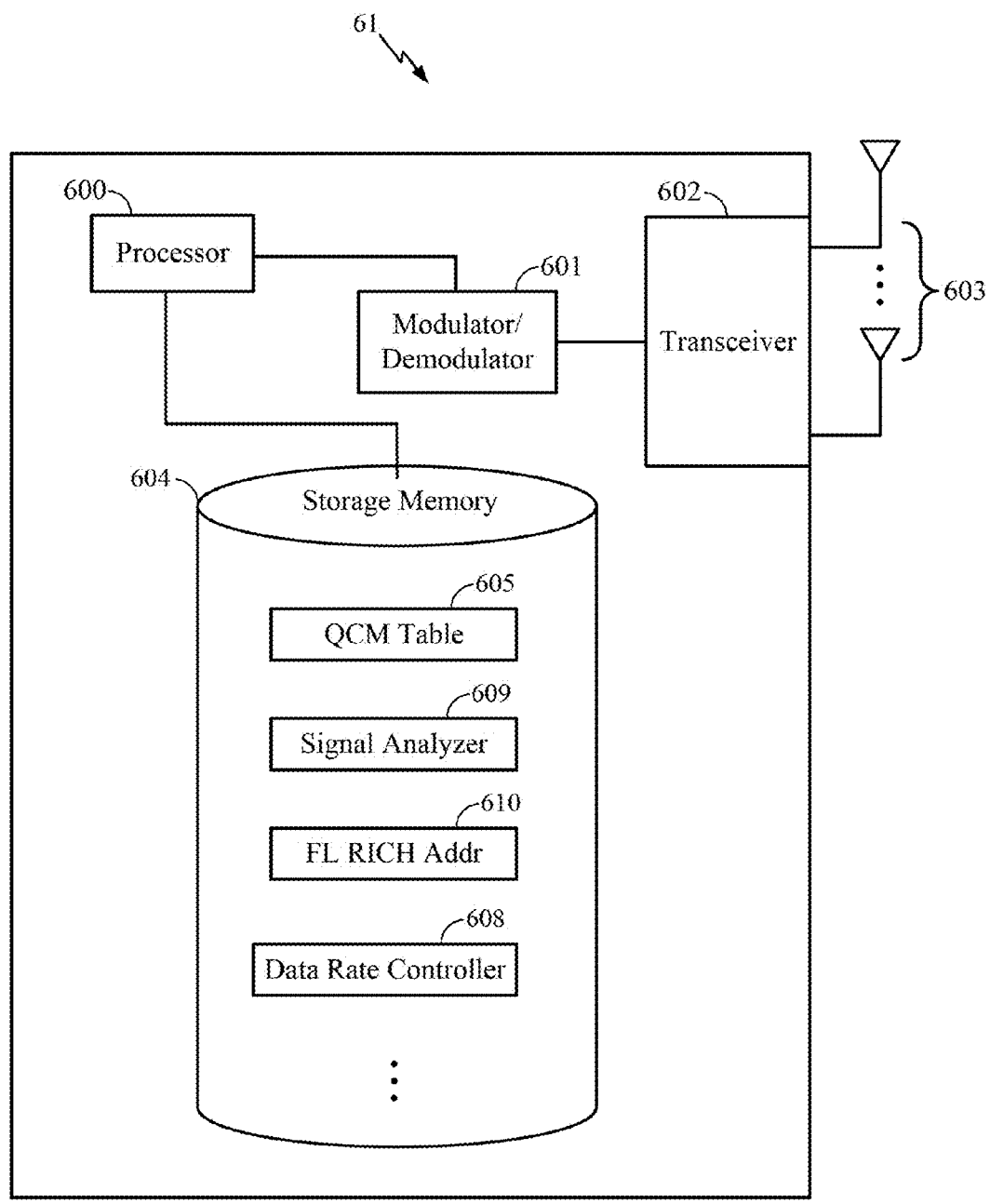

FIG. 6B is a block diagram illustrating a satellite base station 61 configured according to one embodiment of the present teachings. The satellite base station 61 includes much of the basic components as contained in the satellite base station 60 (FIG. 6A). The satellite base station includes a processor 600, a mo/dem 601, a transceiver 602 coupled for operation of an antenna array 603, and a storage memory 604. The processor 600 executes software modules or functions stored on the storage memory 604 in order to provide the functionality of the satellite base station 60. The processor 600 executes a data rate controller 608, stored on the storage memory 604, to change the data rate at which data is communicated with an associated UE. The specific rate at which data will be transmitted is governed by QCM indices, which are stored in a QCM table 605.

In operation, when the satellite base station 60 receives a transmitted frame from an associated UE via the antenna array 603, the received signal is processed by the transceiver 602 and demodulated by the mo/dem 601. The processor 600 continues by extracting the QCM index from the transmitted frame and signaling the data rate controller 608 to initiate a data rate change. The processor 600 then uses the FL RICH address 610 to transmit a rate change information signal over the FL RICH to the associated UE. The UE, such as the satellite-enabled mobile device (FIG. 5B), detects this signal and prepares to receive new data at the new rate.

This procedure, in which the associated UE analyzes the signal quality of the FL signal, generates a QCM index, and then transmits the QCM index to the associated satellite base station, creates a process very similar to the existing terrestrial EVDO operation. However, considering the roundtrip message time between a UE and a satellite, an additional functionality to reduce this data rate response time would be beneficial. In that respect, the satellite base station 61 also includes a signal analyzer module 609. When executed by the processor 600, the signal analyzer module 609 performs its own signal analysis on the reverse link (RL) signals received from the associated UE and also predicts a future quality based on the quality analysis. At this point, the satellite base station 61 can then, on its own, transmit rate change information over the FL RICH. When the associated UE detects this signal, it will know when to expect the new data rate to begin.

With this additional functionality, the time used in analyzing signal quality and determining various rate changes may occur in an asynchronous fashion, which could speed the rate change ability in satellite applications of EVDO and other similar technologies.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 7:
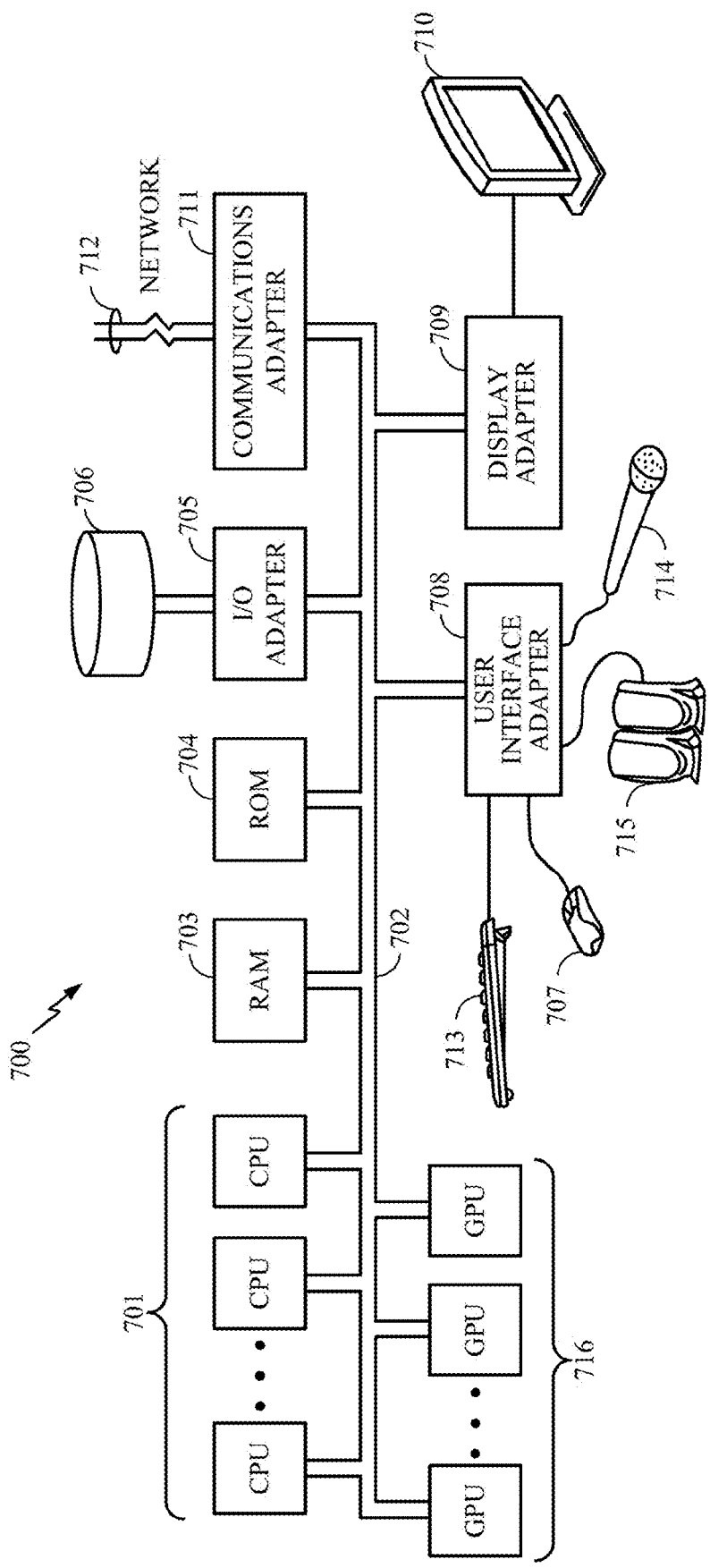
FIG. 7 illustrates an exemplary computer system which may be employed to implement the base stations and their operations therein according to certain embodiments.

FIG. 7 illustrates an exemplary computer system 700 which may be employed to implement the base stations and their operations therein according to certain embodiments. A central processing unit ("CPU" or "processor") 701 is coupled to a system bus 702. The CPU 701 may be any general-purpose processor. The present disclosure is not restricted by the architecture of the CPU 701 (or other components of the exemplary computer system 700) as long as the CPU 701 (and other components of the computer system 700) supports the inventive operations as described herein. As such, the CPU 701 may provide processing to the computer system 700 through one or more processors or processor cores. The CPU 701 may execute the various logical instructions described herein. For example, the CPU 701 may execute machine-level instructions according to the exemplary operational flow described above in conjunction with FIGS. 4A and 4B or to implement the signal flow depicted in FIG. 2. When executing instructions representative of the operational steps and signal processing illustrated in FIGS. 2, 4A, and 4B, the CPU 701 becomes a special-purpose processor of a special purpose computing platform configured specifically to operate according to the various embodiments of the teachings described herein.

The computer system 700 also includes a random access memory (RAM) 703, which may be SRAM, DRAM, SDRAM, or the like. The computer system 700 includes a read-only memory (ROM) 704 which may be PROM, EPROM, EEPROM, or the like. The RAM 703 and ROM 704 hold user and system data and programs, as is well known in the art.

The computer system 700 also includes an input/output (I/O) adapter 705, a communications adapter 711, a user interface adapter 708, and a display adapter 709. The I/O adapter 705, the user interface adapter 708, and/or the communications adapter 711 may, in certain embodiments, enable a user to interact with the computer system 700 in order to input information.

The I/O adapter 705 connects to a storage device(s) 706, such as one or more of hard drive, compact disc (CD) drive, floppy disk drive, tape drive, etc., to the computer system 700. The storage devices are utilized in addition to the RAM 703 for the memory requirements associated with saving the look up tables corresponding channel quality measurements to QCM indices and the like. The communications adapter 711 is adapted to couple the computer system 700 to a network 712, which may enable information to be input to and/or output from the computer system 700 via the network 712 (e.g., the Internet or other wide-area network, a local-area network, a public or private switched telephony network, a wireless network, any combination of the foregoing). A user interface adapter 708 couples user input devices, such as a keyboard 713, a pointing device 707, and a microphone 714 and/or output devices, such as speaker(s) 715 to the computer system 700. A display adapter 709 is driven by the CPU 701 or by a graphical processing unit (GPU) 716 to control the display on the display device 710. The GPU 716 may be any various number of processors dedicated to graphics processing and, as illustrated, may be made up of one or more individual graphical processors. The GPU 716 processes the graphical instructions and transmits those instructions to the display adapter 709. The display adapter 709 further transmits those instructions for transforming or manipulating the state of the various numbers of pixels used by the display device 710 to visually present the desired information to a user. Such instructions include instructions for changing state from on to off, setting a particular color, intensity, duration, or the like. Each such instruction makes up the rendering instructions that control how and what is displayed on the display device 710.

Although the present invention and its advantages have been described in detail, it should be understood that various changes, substitutions and alterations can be made herein without departing from the technology of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for synchronously controlling a forward link (FL) data rate in satellite communications, said method comprising:
   measuring a signal quality on a FL signal;
   predicting a future signal quality based on said measured signal quality;
   creating a quality control measurement (QCM) index corresponding to said future signal quality;
   repeatedly transmitting said QCM index to a satellite base station during a QCM period, said QCM period being determined based at least in part on a time period for a user equipment (UE) to determine said QCM index, and a FL data rate being unchanged during said QCM period;
   preparing to receive new data signals at a new FL data rate related to said QCM index after a QCM delay period, said QCM delay period including said QCM period, and said QCM delay being based on a time for said satellite base station to receive said QCM index; and
   receiving said new FL data signals at said new data rate after said QCM delay period.

2. The method of claim 1 wherein said measuring said signal quality comprises at least one of:
   measuring a signal-to-noise ratio (SNR);
   measuring a signal-to-interference plus noise ratio (SINR); and
   measuring a signal-to-noise plus distortion ratio (SNDR).

3. The method of claim 1 wherein said QCM period relates to a period of time for said satellite base station to reliably detect the QCM index using error-correcting combination of said repeatedly transmitted QCM indices.

4. The method of claim 1 wherein said QCM delay comprises said QCM period plus a maximum roundtrip delay between said UE and said satellite base station.

5. The method of claim 4 wherein said QCM delay further includes processing time at said satellite base station, wherein said processing time comprises:
   detecting said QCM index;
   determining said new data rate associated with said QCM index; and
   modifying a transmission data rate for said new data signals.

6. The method of claim 1 wherein said QCM index comprises one of:
   a data rate control (DRC) index; and
   a channel quality indicator (CQI) index.

7. A satellite-enabled mobile device comprising:
   a processor;
   a modulator/demodulator (mo/dem) coupled to said processor;
   a transceiver coupled to said processor;
   an antenna array coupled to said transceiver;
   a storage memory coupled to said processor; and
   a data rate manager stored on said storage memory, wherein, when executed by said processor, said data rate manager configures said satellite-enabled mobile device:
      to repeatedly embed a quality control measurement (QCM) index into each of a plurality of frames transmitted to an associated satellite base station during a QCM period stored on said storage memory, said QCM index representing a new forward link (FL) data rate, said QCM period being determined based at least in part on a time period for a user equipment (UE) to determine said QCM index, and a FL data rate being unchanged during said QCM period;
      to prepare said satellite-enabled mobile device to receive new FL data signals at said new FL data rate after a QCM delay stored on said storage memory, said QCM delay period including said QCM period, and said QCM delay being based on a time for said satellite base station to receive said QCM index; and
      to receive said new FL data signals at said new FL data rate after said QCM delay period.

8. The satellite-enabled mobile device of claim 7 further comprising a signal analyzer stored in said storage memory, wherein, when executed by said processor, said signal analyzer measures a quality of a FL signal received from said satellite base station, predicts a future quality based on said measured quality, and selects a QCM index from a QCM table based on said predicted future quality.

9. The satellite-enabled mobile device of claim 8 wherein said measured quality comprises at least one of:
   a signal-to-noise ratio (SNR);
   a signal-to-interference plus noise ratio (SINR); and
   a signal-to-noise plus distortion ratio (SNDR).

10. The satellite-enabled mobile device of claim 7 wherein said QCM period comprises a period of time for said satellite base station to reliably detect said QCM index using error-correcting combination of said repeatedly embedded QCM indices.

11. The satellite-enabled mobile device of claim 7 wherein said QCM delay comprises a sum of said QCM period, a maximum roundtrip delay between a user equipment (UE) and said satellite base station, and a processing time at said satellite base station, wherein said processing time includes a time to detect said QCM index, to determine said new data rate associated with said QCM index, and to modify a transmission data rate for said new data signals.

12. The satellite-enabled mobile device of claim 7 wherein said QCM index comprises one of:
   a data rate control (DRC) index; and
   a channel quality indicator (CQI) index.

13. A non-transitory computer-readable medium including program code stored thereon, comprising:
   program code to measure a signal quality on a forward link (FL) signal;
   program code to predict a future signal quality based on said measured signal quality;
   program code to create a quality control measurement (QCM) index corresponding to said future signal quality;
   program code to repeatedly transmit said QCM index to a satellite base station during a QCM period, said QCM period being determined based at least in part on a time period for a user equipment (UE) to determine said QCM index, and a FL data rate being unchanged during said QCM period;
   program code to prepare to receive new data signals at a new FL data rate related to said QCM index after a QCM delay period, said QCM delay period including said QCM period, and said QCM delay being based on a time for said satellite base station to receive said QCM index; and;

program code to receive, said new FL data signals at said new FL data rate after said QCM delay period.

14. The non-transitory computer-readable medium of claim 13 wherein said program code to measure said signal quality comprises at least one of:
program code to measure a signal-to-noise ratio (SNR);
program code to measure a signal-to-interference plus noise ratio (SINR); and
program code to measure a signal-to-noise plus distortion ratio (SNDR).

15. The non-transitory computer-readable medium of claim 13 wherein said QCM period relates to a period of time for said satellite base station to reliably detect the QCM index using error-correcting combination of said repeatedly transmitted QCM indices.

16. The non-transitory computer-readable medium of claim 13 wherein said QCM delay comprises said QCM period plus a maximum roundtrip delay between a user equipment (UE) and said satellite base station.

17. The non-transitory computer-readable medium of claim 16 wherein said QCM delay further includes processing time at said satellite base station, wherein said processing time comprises a time used:
to detect said QCM index;
to determine said new data rate associated with said QCM index; and
to modify a FL transmission data rate for said new data signals.

18. The non-transitory computer-readable medium of claim 13 wherein said QCM index comprises one of:
a data rate control (DRC) index; and
a channel quality indicator (CQI) index.

19. A system to synchronously controlling a forward link (FL) data rate in satellite communications, said system comprising:
means for measuring a signal quality on a FL signal;
means for predicting a future signal quality based on said measured signal quality;
means for creating a quality control measurement (QCM) index corresponding to said future signal quality;
means for repeatedly transmitting said QCM index to a satellite base station during a QCM period, said QCM period being determined based at least in part on a time period for a user equipment (UE) to determine said QCM index, and said FL data rate being unchanged during said QCM period;
means for preparing to receive new data signals at a new FL data rate related to said QCM index after a QCM delay period, said QCM delay period including said QCM period, and said QCM delay being based on a time for said satellite base station to receive said QCM index; and
means, for receiving said new FL data signals at said new FL data rate, said new FL data signals being received after said QCM delay period.

20. The system of claim 19 wherein said means for measuring said signal quality comprises at least one of:
means for measuring a signal-to-noise ratio (SNR);
means for measuring a signal-to-interference plus noise ratio (SINR); and
means for measuring a signal-to-noise plus distortion ratio (SNDR).

21. The system of claim 19 wherein said QCM period relates to a period of time for said satellite base station to reliably detect the QCM index using error-correcting combination of said repeatedly transmitted QCM indices.

22. The system of claim 19 wherein said QCM delay comprises said QCM period plus a maximum roundtrip delay between said UE and said satellite base station.

23. The system of claim 22 wherein said QCM delay further includes processing time at said satellite base station, wherein said processing time comprises a time used:
to detect said QCM index;
to determine said new FL data rate associated with said QCM index; and
to modify said new FL data rate for said new data signals.

24. The system of claim 19 wherein said QCM index comprises one of:
a data rate control (DRC) index; and
a channel quality indicator (CQI) index.

* * * * *